United States Patent [19]

Waterworth

[11] Patent Number: 4,758,130
[45] Date of Patent: Jul. 19, 1988

[54] TWO ROTARY GEAR PUMPS ARRANGED IN DIFFERENT PLATES

[75] Inventor: Anthony Waterworth, Rawdon, England

[73] Assignee: Autovalves Engineering, England

[21] Appl. No.: 881,845

[22] Filed: Jul. 3, 1986

[30] Foreign Application Priority Data

Jul. 9, 1985 [GB] United Kingdom ............... 8517304

[51] Int. Cl.[4] .................. F04B 41/00; F04C 11/00; F01M 1/02
[52] U.S. Cl. .................................. 417/236; 418/39; 418/166; 418/212; 123/196 R; 123/198 C
[58] Field of Search ............ 418/166, 170, 171, 200, 418/212, 39; 417/360, 236, 238; 123/196 R, 198 C

[56] References Cited

U.S. PATENT DOCUMENTS

| | | | |
|---|---|---|---|
| 1,773,211 | 8/1930 | Wilsey | 418/170 |
| 2,622,534 | 12/1952 | Johnson | 418/179 |
| 2,931,303 | 4/1960 | Dlugos | 418/200 |
| 3,016,834 | 1/1962 | Deska et al. | 418/171 |
| 3,057,434 | 10/1962 | Hanley | 418/200 |
| 3,472,023 | 10/1969 | Gimmler | 418/200 |
| 4,195,480 | 4/1980 | Shelby et al. | 418/200 |

FOREIGN PATENT DOCUMENTS

| | | | |
|---|---|---|---|
| 206802 | 1/1940 | Switzerland | 418/170 |
| 703051 | 1/1954 | United Kingdom . | |
| 957531 | 5/1964 | United Kingdom . | |
| 1011708 | 12/1965 | United Kingdom . | |
| 1021000 | 2/1966 | United Kingdom | 418/166 |

OTHER PUBLICATIONS

1974 *Chevrolet Vega Shop Manual*, 7/1974, General Motors Corp., Detroit, Michigan, FIGS. 1N–3N, 52N–62N.

*Primary Examiner*—John J. Vrablik
*Attorney, Agent, or Firm*—Klauber & Jackson

[57] ABSTRACT

The invention provides an oil pump as a replacement for the conventional piston type oil pumps used in Triumph motor cycles. The pump of the invention comprises a plurality of plates with a feed pump section between a pair of plates and a scavenge section between another pair of plates. Appropriate bores and galleries are provided between the plates for the pumping of the oil. The pumping sections are formed by rotary lobed pump members.

10 Claims, 4 Drawing Sheets

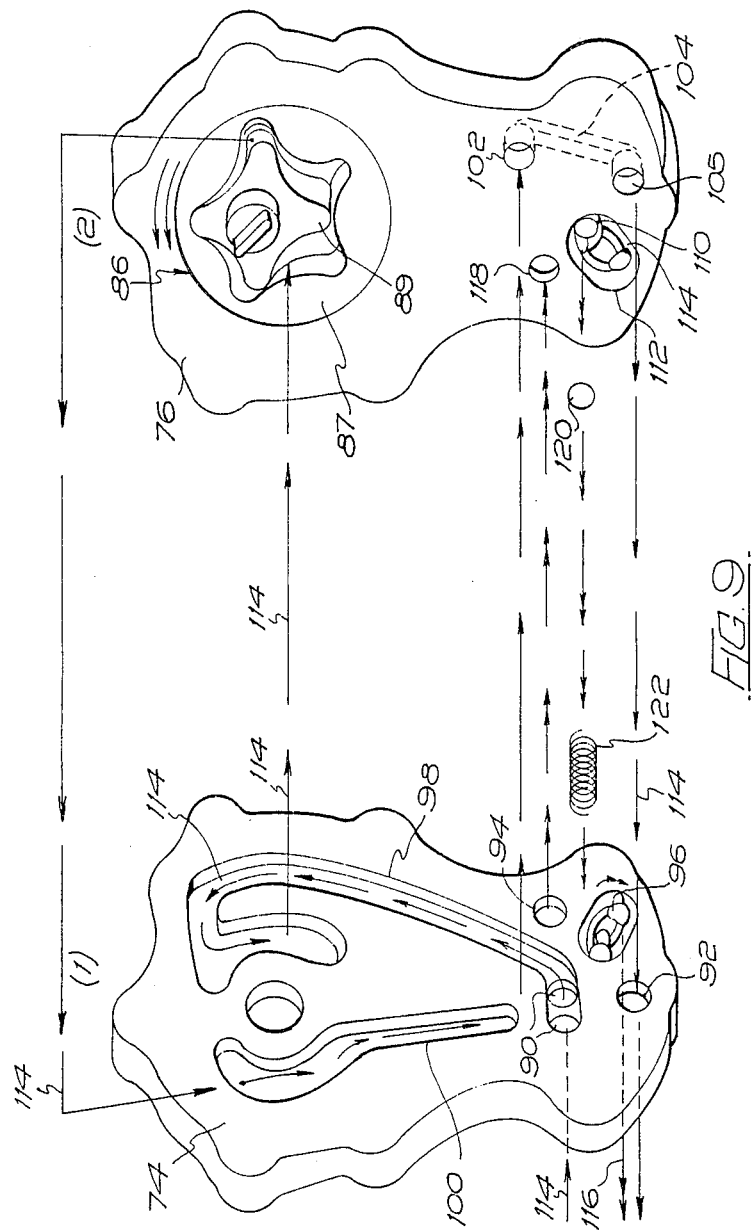

TWO ROTARY GEAR PUMPS ARRANGED IN DIFFERENT PLATES

This invention relates to pumps, and in particular relates to pumps for motor cycles of the type sold under the name "Triumph" being Triumph twin motor cycles of ratings 350, 500, 650, and 750. The motor cycles may have engine types which are described as "unit" and "pre-unit." In the unit type, the engine and gear box are formed as a single unit, whilst in the pre-unit type, the engine and gear box are more spaced or separated.

The present invention is concerned with the provision of an oil pump for the engines of such motor cycles, which are referred to herein and in the claims as "motor cycles of the type set forth", as the invention was made to meet a specific problem which occurs in connection with motor cycles of the type set forth, but it is submitted that the invention may have wider application in circumstances where similar problems exist although we do not know of any such circumstances at this time, because different makes of motor cycles utilise different oil pump arrangements.

The oil pump of a motor cycle of the type set forth is for performing two functions, namely the pumping of lubricating oil to the crank shaft bearings, and the scavenging of oil from the engine sump. An oil reservoir spaced from the engine sump is provided, and the oil pump draws oil from this reservoir and feeds same to the crank shaft by means of a feed section of the pump, whilst the scavenge section scavenges oil from the sump and returns it to the reservoir. The scavenge section has a bigger pumping rate than the feed section in order to ensure that oil will not collect in the sump other than to a pre-determined level dictated by the extent to which suction pipe forming the suction side of the scavenge section extends into the sump. Typically, the design will be such as to leave only a small amount, say 100 cc, of oil in the sump during the running of the engine.

The crank case of a motor cycle of the type set forth is provided with a mounting for the oil pump, and such mounting comprises a face portion of the crank case which is flat and has a number of ports provided therein for the suction and delivery of the oil. The known pump comprises a pump body which is secured to the face portion by means of fixing screws or bolts, the pump body having apertures which match the ports. Pumping is achieved in that the pump body has a pair of cylinders in which are located rod plungers or pistons having connecting ends which are connected by means of an eccentric to a driven shaft of the engine. This driven shaft lies parallel to the crank shaft and its axis is spaced from but at right angles to the said face portion.

The pump body comprises suction apertures for the respective pistons or plungers, which form the active components of the feed and scavenge sections of the pump, and delivery apertures on opposite sides of spring loaded one way valves so that, in conventional fashion, reciprocation of the plungers during operation of the engine effects pumping of the oil through the feed section and through the scavenge section. The differential rate of delivery of the respective sections is achieved by making one of the plungers slightly larger in diameter than the other. The pump is concealed in that it is covered by means of a crank case cover.

Such a pump has been used in connection with motor cycles of the type set forth for in excess of thirty years, but the pump is a source of difficulty insofar as if solid particles are entrained inside the pump, this can cause the jamming of the one-way valves, and blockage and ineffectiveness of the pump, and starvation of oil to the crank shaft, can result.

Many attempts have been made to design a new pumping unit to overcome this problem but as yet no attempt has been commercially successful because of the constraints imposed on the designing of an alternative pump unit. One of the constraints is that the pump should be capable of being encased by the crank case cover, which means that the pump must be a small hand holdable unit.

The pump according to the present invention meets all requirements and has performed satisfactorily under road and bench testing.

The invention comprises the provision of a pump as a replacement of a known pump in motor vehicles of the type set forth, and the pump is constructed from three plates arranged in sandwich construction and between respective adjacent plates are pumping chambers having rotary pumping elements forming respectively the scavenge pump section and feed pump section, and wherein galleries are formed between the opposed plate faces to provide for the feed and return of oil pumped by the rotary pumping members from and to a group of ports arranged to match the porting on the face section of the crank case, the pumping members being arranged to be driven by the said driven shaft of the engine, a suitable adaptation of the drive coupling being provided if required.

If the three plates are described as first, second and third as related to the order of their closeness to the face section of the crank case, the scavenge pump section being arranged between the first and second plates, whilst the feed pump section is arranged between the second and third plates.

There may be a one-way check valve between the second and third plates and in the discharge passage from the feed section.

The pumping members may comprise, for each pump section, inner and outer rotary lobed members.

The construction according to the invention provides a pump unit which can be manufactured simply from flat plate bored and milled to provide the necessary ports and galleries, and is shaped so as to fit inside the crank case cover. It can be bolted onto the base section directly in place of the conventional pump.

An embodiment of the invention will now be described, by way of example, with reference to the accompanying drawings, wherein.

Figure 4:
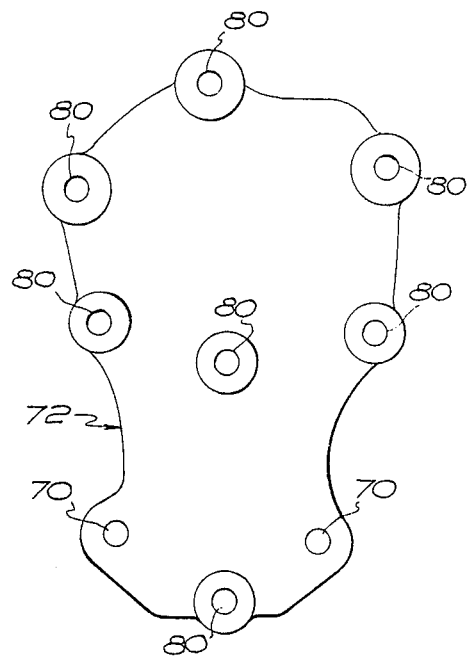
FIG. 4 is a front view of the pump according to the present invention.
Figure 5:
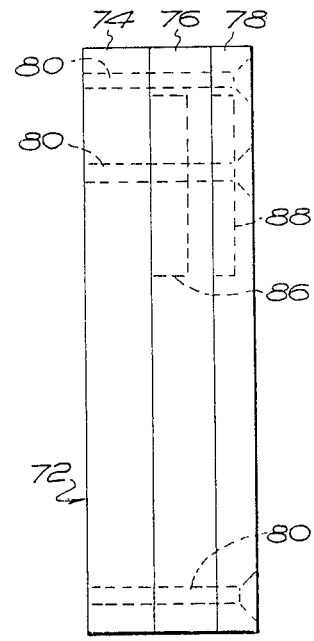
FIG. 5 is a side view of the pump shown in FIG. 4.
Figure 6:
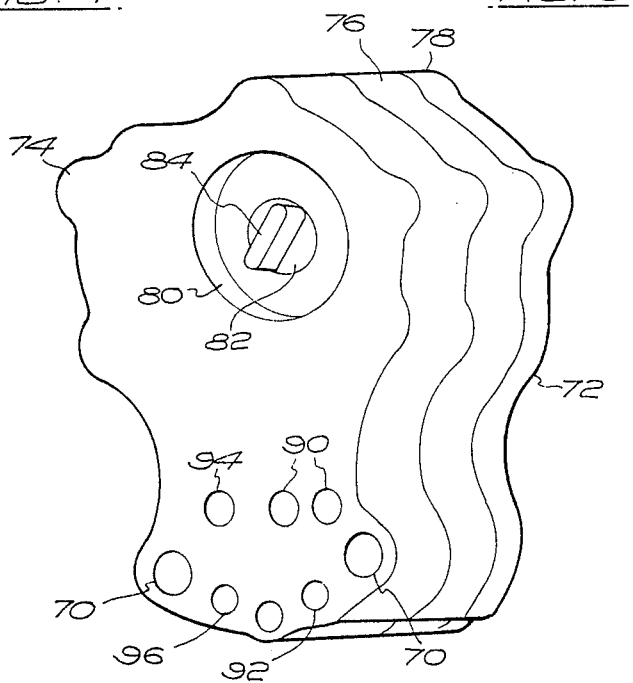
FIG. 6 is a perspective view of the pump shown in FIGS. 4 and 5.
Figure 7:
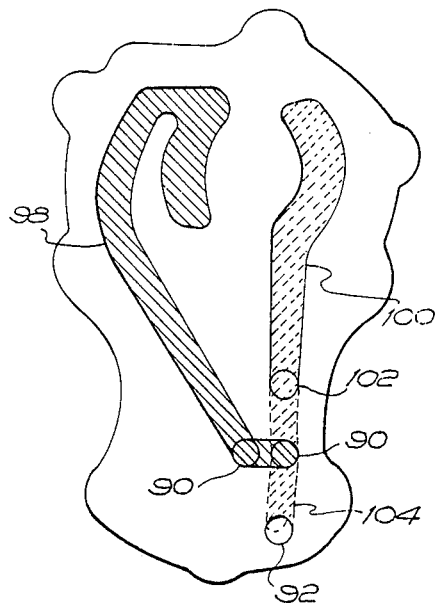
Figure 8:
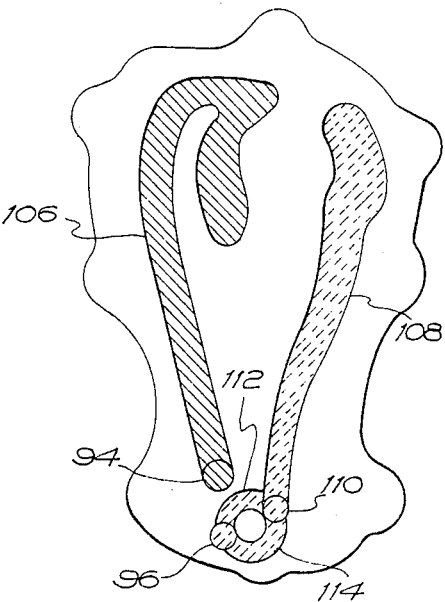
Figure 10:
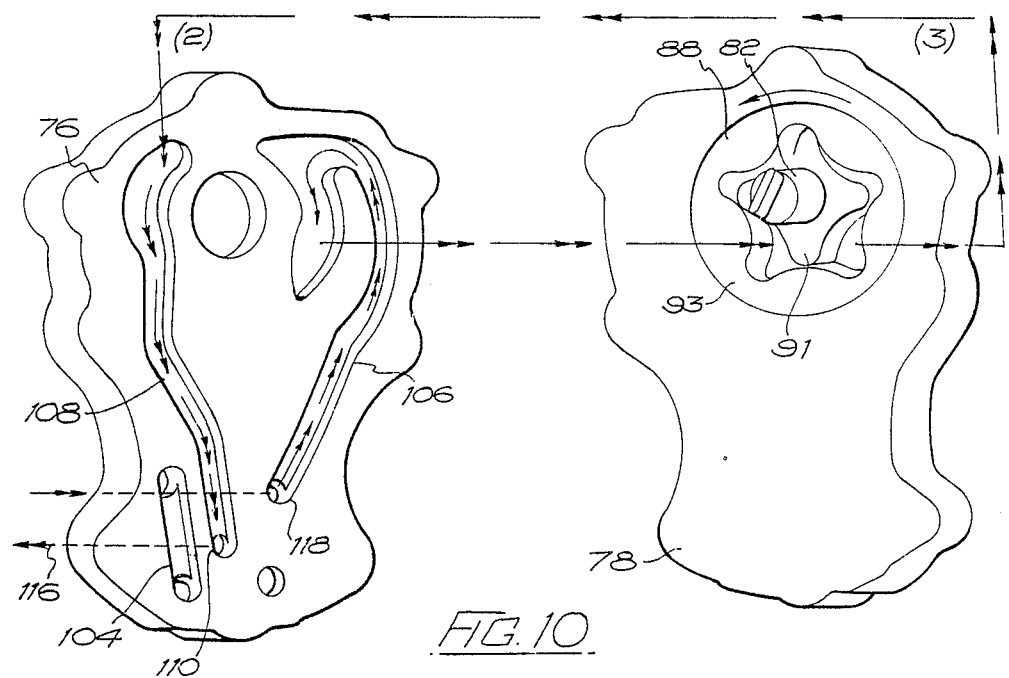

FIGS. 7 and 8 respectively are diagrammatic views showing the oil galleries in the pump shown in FIGS. 4, 5 and 6;

FIG. 9 is a developed view showing the opposing faces of the first and second plates shown in FIGS. 4, 5 and 6; and FIG. 10 is a view similar to FIG. 9 but showing the second and third plates.

Figure 1:
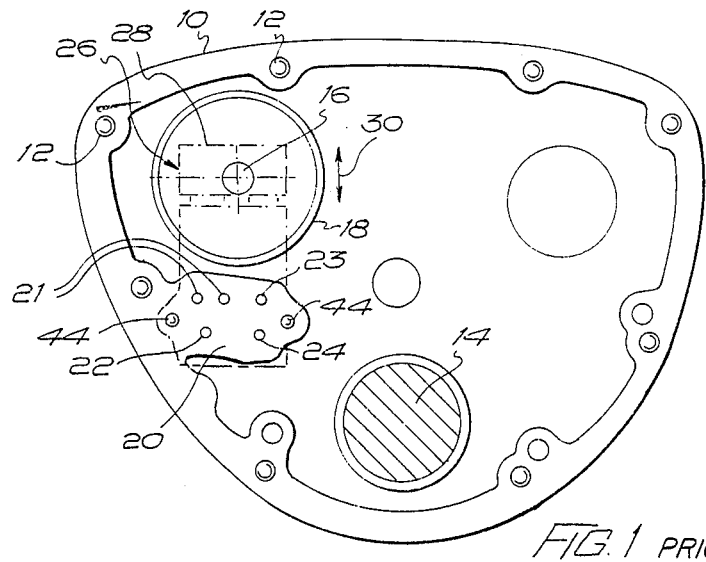
FIG. 1 is a side elevation of a portion of a crank case of a motor cycle of the type set forth.

Referring to FIG. 1, a portion 10 of the motor cycle crank case is shown, such section 10 being coverable by means of a timing case cover (not shown). The crank case portion 10 is provided around its periphery with threaded apertures 12 for the receipt of screws which connect the cover thereto and in the figure is shown the crank shaft 14 of the engine and a parallel shaft 16 carrying gear wheel 18. The shaft 16 is in fact a cam shaft, but is main function is not material to the present invention. Located under the shaft 16 is a face portion 20 of the crank case which is provided with various ports 21, 22, 23 and 24. There is a pair of ports 21, whilst ports 22, 23 and 24 are single ports. Shown in dotted lines in FIG. 1 is a conventional oil pump, being designated by numeral 26. The pump is coupled via a block 28 to the shaft 16 in an eccentric fashion so that rotation of shaft 16, which occurs when the engine is running, effects reciprocation of the block 28 in the manner illustrated by arrow 30. This effects operation of the pump 26 resulting in scavenging of the crank case sump of oil and returning it to a reservoir, and also suction of oil from the reservoir and feeding of oil to the bearings of the crank shaft 14, through appropriate passages leading to and from the ports 21 to 24. Ports 21 and 22 respectively comprise the suction and delivery sides of a scavenge section of the pump, while portrs 23 and 24 respectively form the suction and delivery side of the feed section of the pump.

Figure 2:
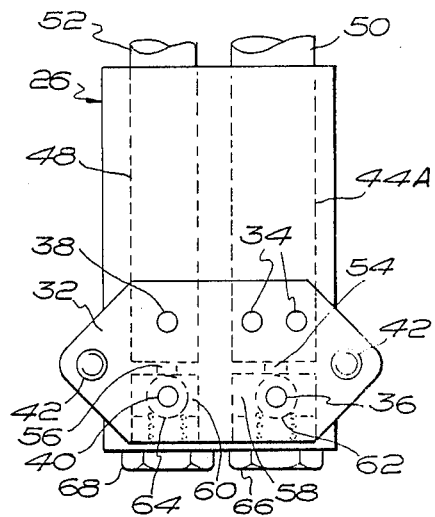
FIG. 2 is a side view of the pump indicated in FIG. 1.
Figure 3:
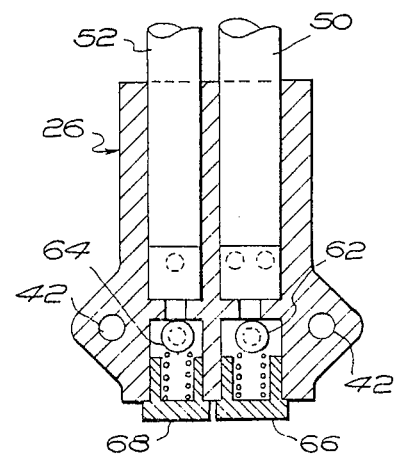
FIG. 3 is a sectional elevation of a pump shown in FIG. 2.

If reference is now made to FIGS. 2 and 3, it will be understood how the pump 26 operates.

As this invention is concerned with a pump for mounting on the face section 20 of the crank case, when referring to the respective sides of the conventional pump and the pump according to the invention, the expression "face" refers to the side which faces the section 20, whilst the expression "rear" refers to the opposite side.

In FIG. 2 the conventional pump is viewed from its face side, and it will be seen that it comprises a mounting face 32 provided with suction ports 34, a delivery port 36, a further suction port 38 and a further delivery port 40 which respectively register with the ports 21, 22, 23 and 24 when the pump is attached to face portion 20. Attachment is by means of screws which pass through apertures 42 in the pump body and engage threaded apertures 44 in face portion 20. The pump body is provided with two bores 44A, 48 defining pumping chambers receiving pumping plungers 50 and 52. The plungers 50 and 52 and, bores 44A and 48 are of different displacement thereby to define the scavenge section of the pump and the feed section of the pump.

The bores 44A and 48 are blind bores except for output passages 54 and 56 which lead to output chambers 58 and 60. These chambers contain spring loaded one-way ball valves 62 and 64 and delivery ports 36 and 40 respectively communicate therewith. The chambers 58 and 60 are closed by means of screw plugs 66 and 68.

As will be readily understood, as the plungers 50 and 52 are reciprocated, oil is drawn in through ports 34 and 38 respectively from the sump and oil reservoir, and as the plungers 50 and 52 are returned, i.e. they descend in FIG. 2, when they pass ports 34 and 38 the oil remaining in the pumping chambers is forced past the valves 62 and 64 into chambers 58 and 60 and eventually out of ports 36 and 40.

The conventional pump suffers considerably from failure as a result of blockage of the chambers 58 and 60 due to the accumulation of dirt in such chambers and in the vicinity of the one-way valves 62 and 64.

The present invention provides a pump which overcomes these difficulties, and one embodiment is illustrated in FIGS. 4 to 10.

Referring firstly to FIGS. 4, 5 and 6, the pump comprises the plan configuration shown in FIG. 4. It is this shape so that it will attach directly to screw threaded bores 44 and 46 in face section 20 by passing bolts through holes 70 in the pump shown in FIGS. 4 to 6.

As shown in FIGS. 5 and 6, the pump 72 comprises three plates 74, 76 and 78 which are secured together by means of bolts 80. The view in FIG. 4 is viewing the rear face of the third plate 78, whilst in FIG. 6, the assembly being turned round, the face side of plate 74 is in view, although the plates 76 and 78 are also visible as FIG. 6 is a perspective view.

As is seen in FIG. 6, the face side of plate 74 is recessed as shown at 80 for receiving the end of shaft 16 when the pump is connected to the crank case, and the end of a drive shaft 82 is also visible, such shaft 82 having a key 84 permitting the driving of the shaft 82 by means of shaft 16. Shaft 16 may require to have an adaptor enabling it to be drivingly coupled to the key 84. Driving of shaft 82 effects driving of rotary pumping members in pumping chambers 86 and 88 illustrated in dotted lines in FIG. 5.

FIG. 6 also shows that the face side of plate 74 is provided with ports 90, 92, 94 and 96 which, when the pump is attached to the face portion 20 of the crank case, respectively register with ports 21, 22, 23 and 24. Between the plates 74, 76 and 78 are ports and galleries for the passage of oil from the respective ports 90 and 94 to the pumping chambers 86 and 88 and then eventually back out of the delivery ports 92 and 96, and if reference is made to FIGS. 7 and 8 the oil flow paths will be explained.

If FIG. 7, the flow of oil through the scavenge section of the pump is illustrated. The two ports 90 are shown and when the scavenge pump section 86 is operative, oil is drawn in through the ports 90 and is drawn along gallery 98 to the suction side of the pump section 86. Oil is discharged from the pressure side of the pump into another gallery 100 which leads to an auxilliary port 102 (which is in plate 76) and on the rear side of plate 76 is a bridge gallery 104 which leads to the discharge port 92. The galleries 98 and 100 are formed on the rear side of plate 74, whilst the pumping chamber 86 is formed in the face side of plate 76.

FIG. 8 shows the suction and delivery paths of the oil passing through the feed pump section which is between plates 76 and 78. Sucton port 94 is shown and this leads to a gallery 106 formed in the rear side of plate 76. At the discharge side of the feed pump section there is a gallery 108 leading to an intermediate port 110 provided with a check valve. Oil passing this check valve flows to link galleries 112, 114 which lead to the discharge port 96.

FIGS. 9 and 10 illustrate the oil flow paths in a more graphical form and also illustrate the two pumping sections 86 and 88.

In FIG. 9 the first and second plates 74 and 76 designated 1 and 2 in FIG. 9 are shown in developed elevation in which the rear side plate 74 and the front side plate 76 are visible.

The galleries 98 and 100 are clearly visible as are the two ports 90 which couple to the gallery 100 as shown. The auxiliary port 102 is visible in plate 76 and the bridge gallery 104 is shown in dotted lines. It leads to a port 105 in plate 76 which registers with the discharge port 92 in plate 74. The oil flow path for the scavenge pump section 86, which comprises an outer lobed rotor 87 and an inner lobed rotor 89, is illustrated by the single headed arrows 114. It can be seen that the oil is drawn from the engine sump through ports 21 in face section 20 and is supplied through ports 90, gallery 98 to the suction side of scavenge pump 86, is delivered from the pressure side of scavenge pump 86 to gallery 100 then passes through auxiliary port 102, bridge gallery 104, port 105 and eventually is delivered through port 92.

FIG. 10 illustrates the plates 76 and 78, the rear side of plate 76 being shown and the face side of plate 78 being shown. The feed pump section is contained in the face side of plate 78 and comprises, like pump section 76, inner and outer lobed rotors 91 and 93. The galleries 106 and 108 are shown and the oil flow path is indicated by the double headed arrows 116. Following these arrows from entry to exit, it will be seen that the oil enters, as shown in FIG. 9 through port 94, passes through an aligned port 118 in plate 76, passes through gallery 106 to the suction side of pump 88, is delivered from the pressure side of pump 88 to gallery 108, is returned to port 110 in plate 76, past the spring loaded one-way ball valve indicated by ball 120 and spring 122 in FIG. 9, travel along the link galleries 112, 114, and eventually emerges through outlet port 96.

The achievement of differential outputs from the respective pump sections 86 and 88 is achieved by making the rotary parts of pump section 86 thicker than those of section 88 so that a bigger swept volume is achieved in pump section 86.

The inner rotors 89 and 91 may be coupled to the shaft 82 by means of pin and slot arrangements.

The pump plates may be formed from flat metal stock. such as aluminium, bored and milled to provide the cavities, bores and galleries as required but the plates can also be formed by alternative methods provided the operating characteristics necessary can be achieved.

The pump unit according to the present invention represents a unique and efficient replacement for the pump unit of the type illustrated in FIGS. 2 and 3.

I claim:

1. A rotary pump as a replacement of a known reciprocating pump, the rotary pump comprising:
    three flat plates arranged face to face in a sandwich construction;
    pumping chambers arranged between respective adjacent plates, said pumping chambers having rotary pumping members forming respectively a scavenge pump section and a feed pump section in said chambers;
    galleries formed between opposed faces of said plates to provide for feed and return of oil pumped by the rotary pumping members and to a group of ports, all arranged on an outer face of one of said plates to match the porting on a face section of a crank case, said ports being connected to said galleries; and
    the pumping members being arranged to be driven by a driven shaft of an engine.

2. A pump according to claim 1, wherein the three plates comprise first, second and third as related to the order of their closeness to the face section of the crank case, the scavenge pump section being arranged between the first and second plates, whilst the feed pump section is arranged between the second and third plates.

3. A pump according to claim 2, wherein there is a one-way check valve between the second and third plates and in the discharge passage from the feed section.

4. A pump according to claim 1, 2 or 3, wherein the pumping member comprises, for each pump section, inner and outer rotary lobed members.

5. A pump according to claim 1, wherein the said plates are formed from flat plate bored and milled to provide the necessary bores and galleries.

6. A pump according to claim 1, wherein the plates are of aluminium.

7. A rotary pump to replace a known reciprocating pump in a motor vehicle having an engine casing inside of which the said known reciprocating pump is normally located and wherein ports for the suction and delivery of oil are provided in an engine casing flat face to which the known pump is mounted by means of bolts passing through holes in the reciprocating pump and engaging bores in the casing and wherein an engine drive shaft spaced from said ports engages the pump for the driving of the reciprocable portions of same, said rotary pump comprising:
    an assembly of first, second and third flat plates sandwiched together, bolt holes in the assembly for bolting, via said bores in the casing, the assembly to the engine so that the outer flat face of the first plate engages the casing flat face in place of the reciprocating pump, complementary ports in the outer face of the first plate which register with said suction and delivery ports in the casing, a first pumping chamber between the first and second plates, first rotary pumping means in said first chamber, a second pumping chamber between the second and third plates, secondary rotary pumping means in said second chamber, first suction passage means in said plates leading from said complementary ports to said first pumping chamber, first delivery passage means in said plates leading from the first pumping chamber back to said complementary ports, second suction passage means in said plates leading from said complementary ports to said second pumping chamber, second delivery passage means in said plates leading from the second pumping chamber back to said complementary ports, whereby oil is supplied to and returned from the first and second rotary pumping means through the outer flat face of the first plate and the rotary pump performs a function normally performed by the reciprocating pump, the assembly including drive shaft means for driving the first and second rotary pump means for the pumping of oil thereby, the said drive shaft means being adapted to be drivingly connected to the engine drive shaft when the rotary pump is bolted to the casing.

8. A rotary pump as claimed in claim 7, wherein the first pumping chamber is defined by a recess in the face of the second plate which is adjacent the first plate.

9. A rotary pump according to claim 8, wherein the second pumping chamber is defined by a recess in the face of the third plate which is adjacent the second plate.

10. A rotary pump according to claim 8 or 9, wherein the first and second rotary pumping means are rotatable about a common axis.

* * * * *